United States Patent [19]

Jang

[11] Patent Number: 5,785,336

[45] Date of Patent: Jul. 28, 1998

[54] BICYCLE WITH ARM POWERED AND SPEED ENHANCING APPARATUS

[76] Inventor: Ik-Byong Jang, Sangshin Apt. 10-101 #1000-2, Sadang 4-dong, Dongjak-Gu, Seoul, Rep. of Korea

[21] Appl. No.: 779,720

[22] Filed: Jan. 7, 1997

[30] Foreign Application Priority Data

May 17, 1996 [KR] Rep. of Korea ............ 96-16597

[51] Int. Cl.$^6$ ...................................................... B62H 1/00
[52] U.S. Cl. ........................................ 280/234; 280/233
[58] Field of Search ............................. 280/233, 234, 280/224, 249, 242.1

[56] References Cited

U.S. PATENT DOCUMENTS 3,948,542   4/1976   Lukich ........................ 280/223
4,733,880   3/1988   Wilhelm ....................... 280/234

Primary Examiner—Robert J. Oberleitner
Assistant Examiner—C. T. Bartz
Attorney, Agent, or Firm—Ladas & Parry

[57] ABSTRACT

A bicycle with apparatus which enables the arms and/or legs of a cyclist to supply rotational force to the rear wheel to enhance acceleration and ease hill climbing is disclosed. The apparatus enables upon repeatedly pivoting the bicycle handle back-and-forth to supply rotational power to the rear wheel to enhance forward speed, especially in combination with the rotational force input by the pedals. An acceleration gear apparatus is also disclosed.

4 Claims, 3 Drawing Sheets

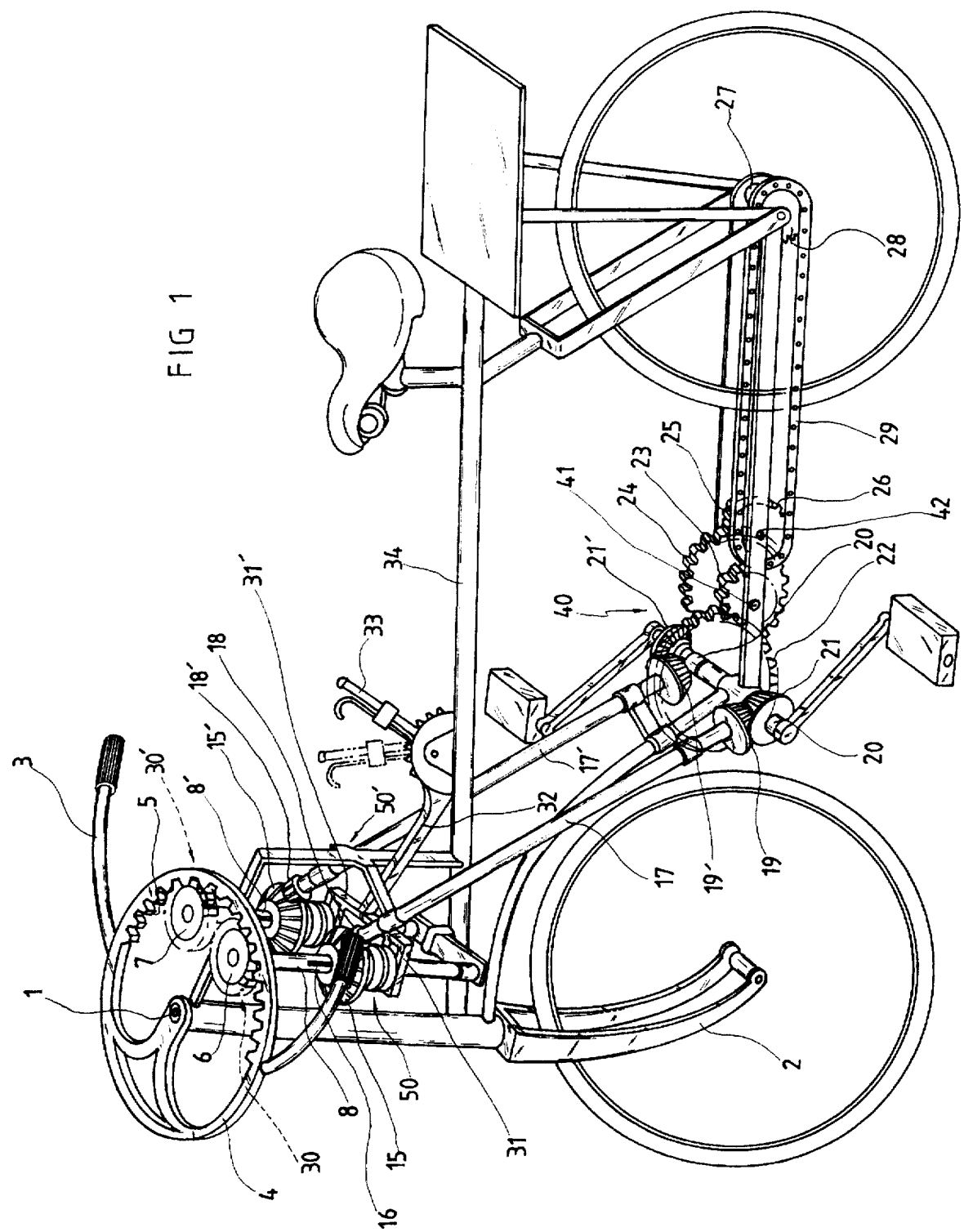

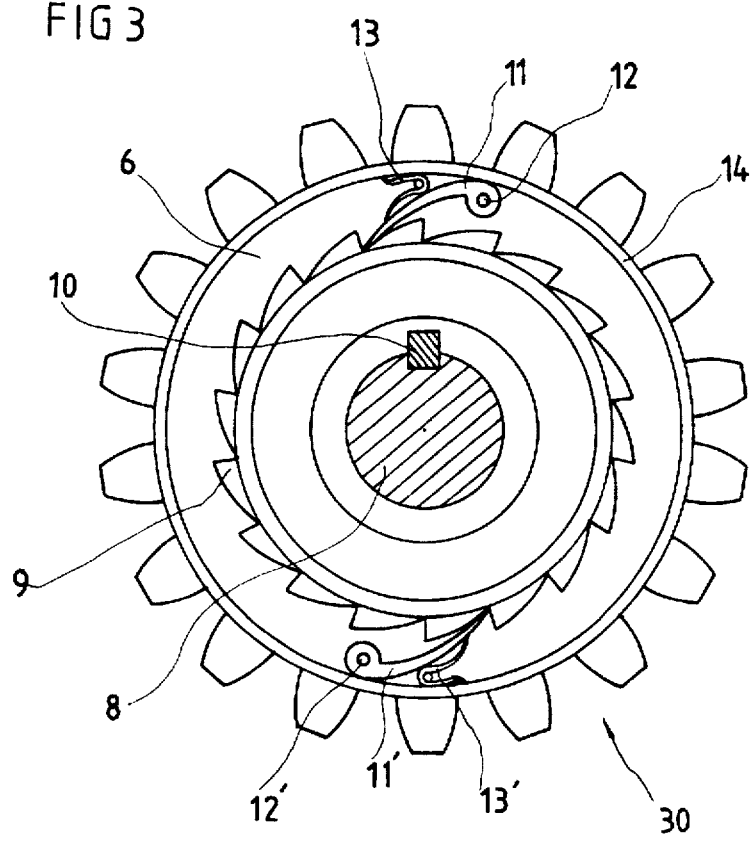
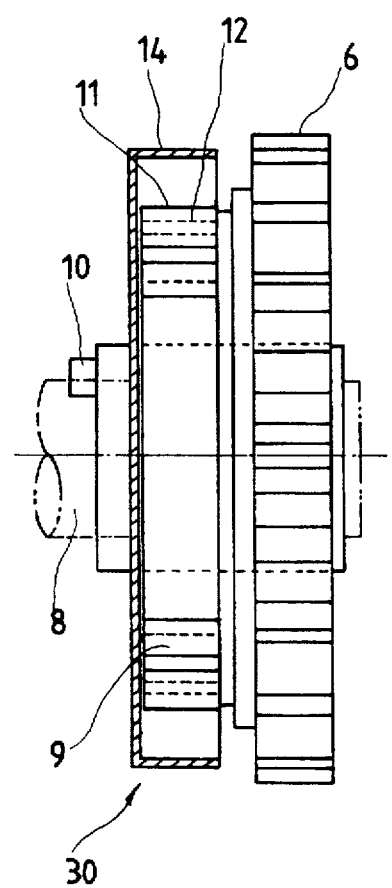
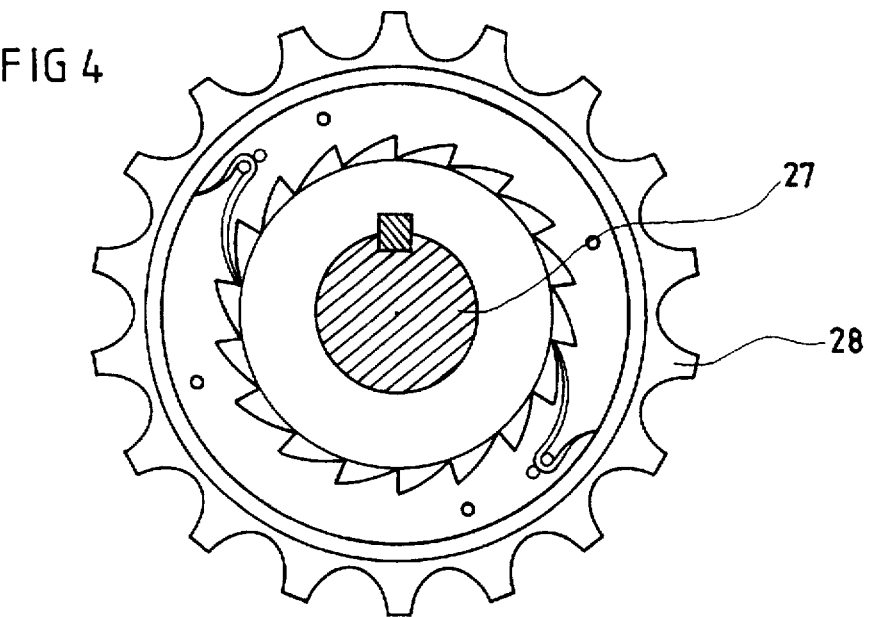

BICYCLE WITH ARM POWERED AND SPEED ENHANCING APPARATUS

BACKGROUND OF INVENTION

1. Field of the Invention

The present invention relates to a bicycle which enables a cyclist to climb a slope at greater speed.

2. Information Disclosure Statement

In the prior art, a three-stage speed reduction apparatus has been widely supplied which reduces speed and enhances the running power of a conventional bicycle thereby aiding the cyclist in riding up a slope with reduced force. However, since the rate of climbing is slowed and a lot of force must be exerted with this apparatus, there has been a need for a bicycle with can optimize the force output by the cyclist and therefore climb the slope at high speed. The bicycle according to the present invention satisfies this need.

When climbing a slope having an inclination of 15 degrees with a conventional bicycle, the speed changing apparatus must be speed changed to reduce the upward speed by using the minimum speed gear and with the pedal being pushed to sustain the upward motion. At this time, the body of the rider is bent forward, the handle is grasped hard and the pedals are being continuously pushed with the handle usually being pulled to aid in the pushing of the pedals. However, this action on the handle while thrusting the pedal can be more efficiently utilized.

If the force is used in a direction opposite to the operation as described above, sometimes the forward wheel is pulled up, but such effort of pulling the handle does not contribute to climbing the slope but rather only adds to the weariness of the cyclist and wastes the energy of the cyclist.

If the energy of the cyclist, which otherwise would be wasted, can be used to assist in climbing the slope, a great effect will be obtained.

In the prior art, downward force is directed by the foot to push the pedal and to enhance the force of pushing the pedal, the upper body is also bent forward to concentrate the weight of the body in that direction, and all the action of the body is concentrated to that direction, however, only the force pushing the pedal gives movement to the bicycle. That is, the movement of the two arms and the upper body only adds to the weariness of the cyclist without adding any effect to propelling the bicycle. Since climbing a slope by means of a bicycle is difficult and slow, the bicycle is not selected as a means of transportation where there are numerous slopes to ride over or where time is important.

Therefore, because of the energy required to propel a conventional bicycle up a slope with an inclination of more than 15 degrees, bicycles are usually avoided by most people as a method of transportation. People think that the bicycle is usable only for flat places and do not appreciate the bicycle as a means to move about. And thus, for people who commute with the bicycle, the slope is a troublesome obstacle.

Thus, it is an object of the present invention to provide a bicycle which more efficiently utilizes the energy available from the cyclist.

It is a further object of the present invention to provide a bicycle which enables the use of the power of the arms of the cyclist to propel the bicycle in a forward direction.

The preceding objects should be construed as only presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the Summary of the Invention and the Detailed Description, below, which describe the preferred embodiment in addition to the scope of the invention defined by the claims considered in conjunction with the accompanying drawings.

SUMMARY OF THE INVENTION

The present invention is constructed in such a way that all the forces which pivot the handle when climbing the slope or at the moment of pushing the pedal are combined to assist in rotating the pedal shaft along with the rotational input by the legs of the cyclist to enhance the pedal shaft rotating force. Thus, the pedal shaft is strongly rotated at high speed which is mechanically conveyed to the rear wheel of the bicycle to permit the bicycle to climb a slope at high speed. In addition, by concentrating the force which pivots the handle back-and-forth by extending the handle, permits even greater speed.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which:

FIG. 1 is a perspective view of a bicycle of the present invention;

FIG. 2 is a side view of the pinion gear 6 and ratchet wheel box 14;

FIG. 3 is a bottom view of the pinion gear 6 and ratchet wheel box 14;

FIG. 4 is a side view of the chain gear 28 of the rear wheel; and

Similar reference characters refer to similar parts throughout the several views of the drawings.

DETAILED DESCRIPTION OF THE INVENTION

Figure 5:
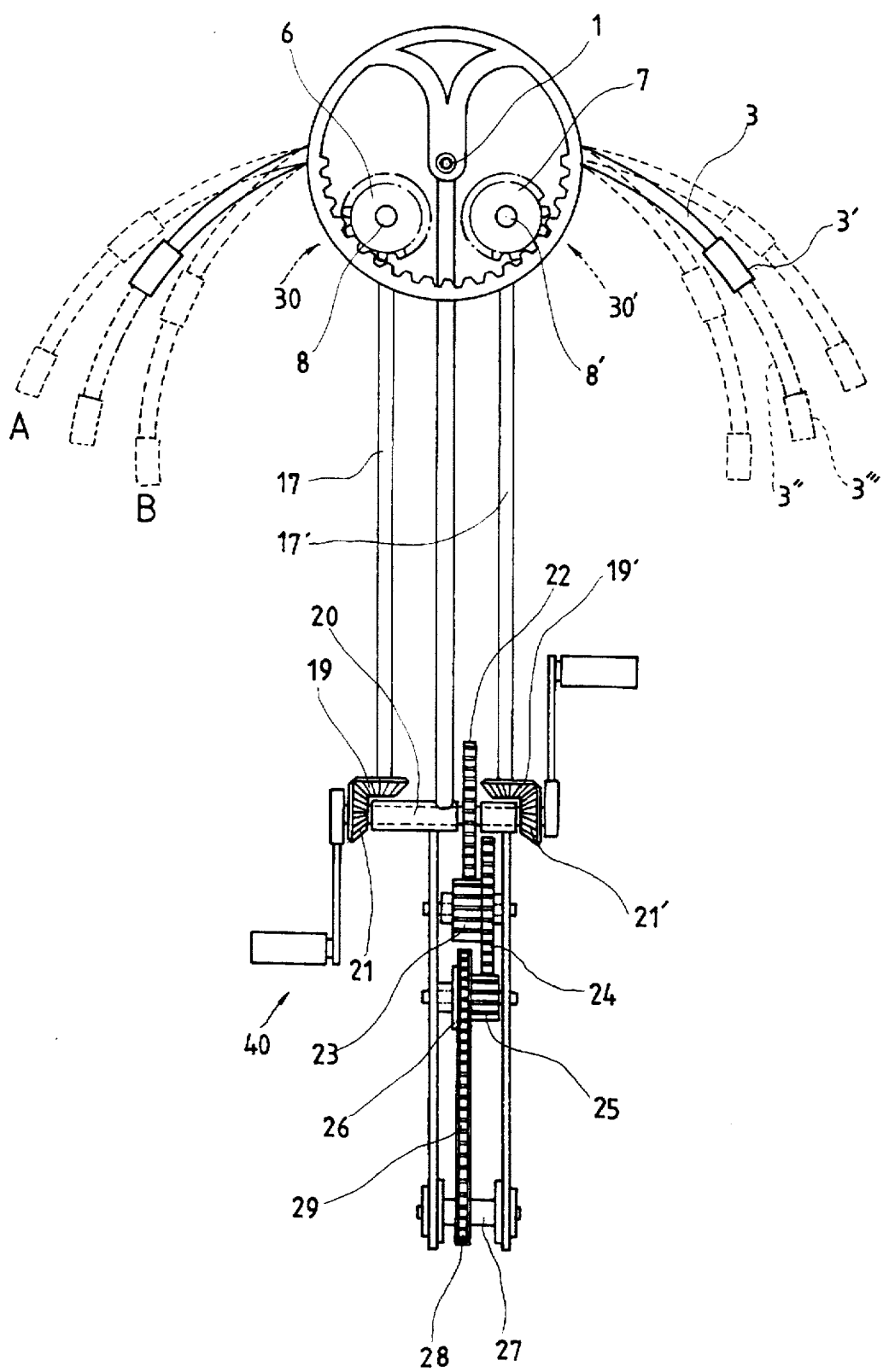
FIG. 5 is a drawing for illustrating the operation of the bicycle of the present invention.

The present invention will be described in detail with reference to the accompanying drawings.

Referring to FIG. 1, the wheel fork 2 secured to the bottom end of handle shaft 1, is curved so as to extend in a rearward direction, unlike the conventional fork which extends in a forward direction, to permit the horizontal rod 34 to be extended. A circular rim 4 is secured to the upper end of the handle shaft 1. The circular rim includes a pair of arms extending therefrom, which define a U-shaped handle 3 to enable steering of the bicycle by the cyclist, similar to a conventional bicycle. The circular rim 4 further includes a plurality of notches formed therein to define a rack 5. The circular rim 4 preferably has a radius of about 30 centimeters. The two pinion gears 6, 7 are operatively positioned to mesh with the rack 5.

A ratchet means 30,30' is provided for each of the pinion gears 6,7 which enables each pinion gear 6,7 to rotate vertical shaft 8,8', respectively, in only one direction (clockwise or counterclockwise) so as to ensure that the rotational direction transferred to the pedal shaft 20 propels the bike in a forward direction.

FIGS. 2 and 3 illustrate the ratchet means 30 as to pinion gear 6, however, the ratchet means 30' for pinion gear 7 is of like construction but insures rotation opposite to that of ratchet means 30, as appreciated by one skilled in this art. As shown in FIGS. 2 and 3, a ratchet wheel 9 is secured to one end of vertical shaft 8, to which the pinion gear 6 is inserted, and fixed to the vertical shaft 8 by key 10. Detents 11, 11' are fitted at the side of each pinion gear 6,7 by a short shaft 12, 12', respectively, as shown in FIG. 3. Each detent 11,11' is spring biased so as to mesh with teeth of the ratchet wheel 9 so that the pinion gear 6 is prevented from imparting reverse rotation of the vertical shaft 8, i.e. to enable pinion gear 6 to rotate vertical shaft 8 in only one direction. A ratchet wheel box 14 is fitted to be parallel to the upper gear 6 and another ratchet wheel box 14' is fitted to be parallel to the pinion gear 7. The ratchet means 30,30' are placed proximate the upper pinions 6,7, as shown in FIGS. 2 and 3. Thus, as shown at FIGS. 2 and 3, the upper pinions 6, 7 together with the ratchet wheel boxes 14, 14', are installed at the upper end of the vertical shafts 8, 8' which are vertical and parallel to each other. Each ratchet wheel box 14, 14' is installed in such a way that the teeth of the ratchet wheel 9 are rotated inward and forward at the left and right of the rider so that if the handle 3 pivots in a clockwise direction, vertical shaft 8' rotates in that direction but the vertical shaft 8 does not rotate, and if the handle pivots in a counterclockwise direction, the vertical shaft 8 is rotates in that direction but the vertical shaft 8' does not rotate.

Bevel gears 15,15' are each positioned in the middle of the vertical shaft 8,8', respectively. A key 16, 16' is used, as shown in FIG. 1, to secure each bevel gear 15, 15' to the vertical shaft 8,8' to permit simultaneous rotation and to permit each of the bevel gears 15,15' to, respectively, slide along vertical shaft 8,8' to permit mechanical engagement or disengagement when desired. Bevel gears 18,18' are secured to each respective upper end of the inclined shaft 17,17' and mesh with the bevel gears 15, 15', respectively. Bevel gears 19,19' are secured to each bottom end of the inclined shaft 17,17', respectively, and mesh with inward bevel 21,21', respectively, at left and right ends of a pedal shaft 20.

Pedal shaft 20 further includes a large diameter pinion gear 22 secured thereto. Pinion gear 22 meshes with smaller pinion gear 23 which is secured to mid-shaft 41. Chain sprocket gear 26, secured to end-shaft 42, is mechanically connected to chain gear 28, as shown in FIG. 4, which is secured to rear wheel shaft 27. Chain gear 28 also includes a ratchet wheel operatively secured to the rear wheel shaft 27.

The preferred diameters of the gears are as follows:

Larger gears 22 and 24 have a relative diameter size of gear 22>gear 24.

Smaller gears 23, and 25 have a relative diameter size of 23>25. Chain gear 26 and 28 have a relative diameter size of 26=28.

The bevel gears 15,15' preferably include a clutch means to permit selective engagement with bevel gears 18,18'. One such clutch means would be to enable bevel gears 15, 15' to be operatively positioned by a fork member 31, 31' by inserting a thrust bearing 50,50' below each bevel gear 15,15', respectively. This would permit bevel gears 15,15' to be moved either to an up (engaged) or down (disengaged) position by an L shaped lever 33 operatively secured to rod 32, as see FIG. 1. The handle 3 may be extended by a tube 3' fitted to each arm of handle 3, to which, optionally, a flexible rod 3" inserted into each tube 3', with each flexible rod terminating in a grip 3'".

Now, the acting effect of the present invention is described, by example, below.

To climb a slope with an inclination of 15 degrees while riding the bicycle of the present invention, if the handle 3 is pivoted to the left (when viewing FIG. 5), i.e. from position B to left to position A while grasping the grip 3'", the rack 5 causes the clockwise rotation of the pinion gear 6, 7. At this time, the pedal shaft 20 is rotated in the direction of progress by transfer of rotation through the bevel gear 15', to bevel gear 18', to inclined shaft 17', to bevel gear 19', and to bevel gear 21'. Rotation is then transferred to the rear wheel via gear 22 of the acceleration gear block 40, as see FIG. 5. The chain 29 rotates the rear wheel shaft at high speed so that high speed movement of the bicycle is achieved. At this time, since the pinion gear 6 idles at the vertical shaft 8, the vertical shaft 8 is stationary. The bevel gear 21 of the pedal shaft 20 rotates in the direction of progress. The bevel gear 18 rotates the bevel gear 15 counterclockwise along the inclined shaft 17. However, since the rotation is via the ratchet wheel box 14, although the vertical shaft 8 is rotated counterclockwise, the rotation of the pinion gear 6 is not affected.

If the grip 3'" is pivoted from position A, right to position B (when viewing FIG. 5), since the rack gear 5 rotates both of the pinion gears 6,7 counterclockwise, the rotation of the gear 6 is transmitted to the vertical shaft 8, to bevel gear 15, to bevel gear 18, to inclined shaft 17, to bevel gear 19, to bevel gear 21 so as to rotate the pedal shaft 20 in the forward direction. The pinion gear 7 idles so as not to affect the operation of counterpart.

When climbing a slope riding the bicycle according to the present invention, since the pedal is strongly pushed, as in a conventional bicycle, and at the same time, the arms of the cyclist continuously pivot the handle left and right so as to achieve the climbing force which strongly rotates the pedal shaft 20 in the forward direction. That is, as the pedals are being pushed, the cyclist's body is making a wide motion to the left and right such that the handle 3 is repeatedly pivoted left and right, i.e. back-and-forth. This climbing force absolutely and substantially contributes to the climbing of the slope so as to make high speed movement up the slope possible.

To climb a slope having an inclination equal to or greater than 15 degrees, the handle shaft 1 is pivoted with the flexible rod 3" fully extended, which enhances the rotational force of the pinion gears 6, 7 by utilizing the principle of the lever so as to reduce the force required for climbing the steep inclination and also enables climbing at high speed.

Therefore, the present invention discloses a novel and improved bicycle which removes a disadvantage in bicycling in that climbing a slope with a conventional bicycle is very hard and slow, such that any cyclist can easily climb such a slope at high speed.

When running the bicycle according to the present invention on level terrain, if the fork 31,31' is lowered by pushing the lever 33 forward, the bevel gears 15,15' are lowered due to gravity so as to mechanically disengage them from the bevel gears 18,18', respectively. Since the interlock between the force obtained by moving the handle 3 left and right and the pedal shaft 20 is interrupted, the bicycle can run on level terrain using only the rotational force of pedals and the action of the acceleration gear block 40. Then, in the event a slope is encountered, the cyclist can manipulate lever 33 so as to raise the thrust bearing 50, 50' with the fork 31, 31' according to the present invention. The bicycle of the present invention is convenient to use and utilizes the leverage of the handle 3 in climbing a slope by meshing the bevel gears 15,15' with the bevel gears 18,18', as discussed above.

As will be appreciated by one skilled in the related art, it is most reasonable and efficient to properly adjust the size of the pinion gears 6,7, the ratchet pinion gears and the bevel gears to rotate the pedal shaft only about one-half revolution for each pivoting of the handle 3, since this relationship coincides with the rhythm of the simultaneous movement of the arms and legs. However, the invention is not limited to the one-half revolution of the pedal shaft.

The longer the length of the handle 3, the less force is required. That is, the length of the handle is the force of this superpower bicycle and at the same time the motive power of enhancement of the superpower.

Even at the time of running on flat terrain, when it is too hard to run or it is necessary to run at high speed, if the acceleration gear is engaged by positioning the acceleration lever at any time, the bicycle can be easily propelled at more than twice as fast as a conventional bicycle. Especially, it is the surprising that the characteristics of this superpower bicycle enable it to climb a slope without requiring much more power as that of the running on the flat place at the same speed.

The design of the bicycle is not necessarily the same as shown in the accompanying drawings but may be varied in various ways for the convenience of consumers or to enhance the appearance of the bicycle within the scope of the present invention without adversely affecting the efficiency and operation of the bicycle according to the present invention.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

What is claimed is:

1. An arm powered and speed enhancing assembly for a bicycle, comprising a bicycle frame rotatably supporting a front wheel and a rear wheel characterized in that said bicycle further includes:

a handle shaft (1) with an upper end and a bottom end secured to a fork (2) having a pair of prongs to rotatably support the front wheel;

a circular rim (4), secured to said upper end of said handle shaft (1) and including a pair of arms, defining a U-shaped handle (3), extending therefrom to enable steering of the bicycle by the cyclist, with said circular rim (4) further including a plurality of notches formed therein to define a rack (5);

a pair of vertical shafts (8,8') operatively secured to said bicycle frame proximate said U-shaped handle (3);

a first pair of pinion gears (6,7) with each being secured to said vertical shaft (8,8'), respectively, and operatively positioned to mesh with said rack (5);

a rachet means (30,30') provided for each of the said first pair of pinon gears (6,7) to enable each of the said first pair of pinion gears (6,7) to rotate said vertical shafts (8,8'), in only one direction, respectively;

a first pair of bevel gears (15,15') secured to each said vertical shaft (8,8') respectively, to enable simultaneous rotation therewith;

a second pair of bevel gears (18,18') with each being secured to an upper end of an inclined shaft (17,17'), respectively, and in mechanical engagement with said bevel gears (15,15'), respectively;

a third pair of bevel gears (19,19') with each being secured to a bottom end of said inclined shaft (17,17'), respectively;

a pair of inward bevel gears (21,21') with each being secured to opposite ends of a pedal shaft (20), respectively, with said inward bevel gears (21,21') in mechanical communication with said third pair of bevel gears (19,19'), respectively; such that in use upon pivoting said U-shaped handle (3) about said handle shaft (1) in a back-and-forth motion, said rack (5) of said circular rim (4) operatively rotates said first pinion gears (6,7), said vertical shafts (8,8'), said first pair of bevel gears (15,15'), said second pair of bevel gears (18,18'), said inclined shafts (17,17'), said third pair of bevel gears (19,19'), and said inward bevel gears (21, 21'), respectively, thereby mechanically transforming said back-and-forth motion of said U-shaped handle (3) into rotation of said pedal shaft (20);

a pedal gear (22) secured to said pedal shaft (20);

a second pinion gear (23) secured to a mid-shaft (41), with said second pinion gear (23) meshed with said pedal shaft gear (22);

a mid-shaft gear (24) secured to said mid-shaft (41);

a third pinion gear (25) secured to an end-shaft (42), with said third pinion gear (25) meshed with said mid-shaft gear (24);

a chain sprocket gear (26) secured to said end-shaft (42) to enable simultaneous rotation with said end shaft and said third pinion gear (25); and a chain gear (28) having a rachet wheel (43) secured to a rear wheel shaft (27), with said chain sprocket gear (26) and said chain gear (28) being in mechanical communication.

2. The arm powered and speed enhancing assembly for a bicycle of claim 1 further comprising a clutch means to permit selective engagement of said first pair of bevel gears (15,15') with said second pair of bevel gears (18,18').

3. The arm powered and speed enhancing assembly for a bicycle of claim 2 wherein said clutch means comprises:

each said first pair of bevel gears (15,15') being slidably secured to each said respective vertical shaft (8,8'), to enable simultaneous rotation therewith and axial movement along each respective vertical shaft to permit selective engagement with each of said second pair of bevel gears (18,18'), respectively; and a thrust bearing (50,50') positioned below each of said first pair of bevel gears (15,15'), respectively, and operatively secured to a shape fork (31,31') to permit said first pair of said bevel gears (15,15') to be moved either to an up (engaged) or down (disengaged) position by manipulation of said shape fork.

4. An arm powered and speed enhancing assembly for a bicycle, comprising a bicycle frame rotatably supporting a front wheel and a rear wheel characterized in that said bicycle further includes:

a handle shaft (1) with an upper end and a bottom end secured to a fork (2) having a pair of prongs to rotatably support the front wheel;

a circular rim (4), secured to said upper end of said handle shaft (1) and including a pair of arms, defining a U-shaped handle (3), extending therefrom to enable steering of the bicycle by the cyclist, with said circular rim (4) further including a plurality of notches formed therein to define a rack (5);

a pair of vertical shafts (8,8') operatively secured to said bicycle frame proximate said U-shaped handle (3);

a pair of pinion gears (6,7) with each being secured to said vertical shaft (8,8'), respectively, and operatively positioned to mesh with said rack (5);

a rachet means (30,30') provided for each said pinion gear (6,7) to enable each said pinion gear (6,7) to rotate said vertical shafts (8,8'), in only one direction, respectively;

a first pair of bevel gears (15,15') secured to each said vertical shaft (8,8') respectively, to enable simultaneous rotation therewith;

a second pair of bevel gears (18,18') with each being secured to an upper end of an inclined shaft (17,17'), respectively, and in mechanical engagement with said bevel gears (15,15'), respectively;

a third pair of bevel gears (19,19') with each being secured to a bottom end of said inclined shaft (17,17'), respectively;

a pair of inward bevel gears (21,21') with each being secured to opposite ends of a pedal shaft (20), respectively, with said inward bevel gears (21,21') in mechanical communication with said third pair of bevel gears (19,19'), respectively;

said pedal shaft (20) having a first and second end with a pedal operatively secured to each said first and second end for inputting rotational force to said pedal shaft (20);

a pedal gear (22) secured to said pedal shaft (20); and a chain gear (28) having a rachet wheel (43) secured to a rear wheel shaft (27), with said pedal gear (22) and said chain gear (28) being in mechanical communication such that in use upon pivoting said U-shaped handle (3) about said handle shaft (1) in a back-and-forth motion, said rack (5) of said circular rim (4) operatively rotates said first pair of pinion gears (6,7), said vertical shafts (8,8'), said first pair of said bevel gears (15,15'), said second pair of said bevel gears (18,18'), said inclined shafts (17,17'), said third pair of said bevel gears (19,19'), and said inward bevel gears (21,21'), respectively, thereby mechanically transforming said back-and-forth motion of said U-shaped handle (3) into rotation of said pedal shaft (20) to combine, in use, rotational force input by said pedals and said inward bevel gears to said pedal shaft thereby enhancing the rotational output of said rear wheel.

* * * * *